United States Patent
Natarajan et al.

(10) Patent No.: US 10,637,924 B2
(45) Date of Patent: *Apr. 28, 2020

(54) CLOUD METADATA DISCOVERY API

(71) Applicant: Microsoft Technology Licensing, LLC., Redmond, WA (US)

(72) Inventors: Shriram Natarajan, Redmond, WA (US); Vladimir Pogrebinsky, Redmond, WA (US); Ryan Jones, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/352,609

(22) Filed: Mar. 13, 2019

(65) Prior Publication Data

US 2019/0215366 A1   Jul. 11, 2019

Related U.S. Application Data

(63) Continuation of application No. 15/135,884, filed on Apr. 22, 2016, now Pat. No. 10,244,051.

(60) Provisional application No. 62/266,669, filed on Dec. 13, 2015.

(51) Int. Cl.
*H04L 29/08* (2006.01)
*H04L 29/12* (2006.01)
*G06F 11/07* (2006.01)

(52) U.S. Cl.
CPC ...... *H04L 67/1097* (2013.01); *H04L 61/1582* (2013.01); *G06F 11/07* (2013.01); *H04L 61/1505* (2013.01); *H04L 61/1541* (2013.01)

(58) Field of Classification Search
CPC .. G06F 11/07; H04L 61/1505; H04L 61/1541; H04L 61/1582; H04L 67/1097
See application file for complete search history.

(56) References Cited

U.S. PATENT DOCUMENTS

| | | | |
|---|---|---|---|
| 2010/0318609 A1* | 12/2010 | Lahiri | G06F 9/455 709/205 |
| 2012/0137001 A1* | 5/2012 | Ferris | H04L 67/16 709/226 |
| 2013/0254847 A1* | 9/2013 | Adams | G06F 21/6218 726/4 |
| 2016/0277497 A1* | 9/2016 | Bannister | H04L 67/1097 |
| 2017/0124111 A1* | 5/2017 | Sharma | G06F 16/178 |

* cited by examiner

*Primary Examiner* — Gil H. Lee
(74) *Attorney, Agent, or Firm* — Workman Nydegger

(57) ABSTRACT

Embodiments provide an API that provides metadata about a cloud service's endpoints in response to a single query. This allows a cloud service to advertise each of its endpoints through a common endpoint. The common endpoint may be present in each of a plurality of cloud services, thereby allowing each cloud service automatically discover metadata for other cloud services.

20 Claims, 4 Drawing Sheets

CLOUD METADATA DISCOVERY API

CROSS-REFERENCE TO RELATED APPLICATIONS

This application is a continuation of U.S. patent application Ser. No. 15/135,884 filed on Apr. 22, 2016, entitled "Cloud Metadata Discovery API," which issued as U.S. patent Ser. No. 10/244,051 on Mar. 26, 2019, which application claims the benefit of the filing date of U.S. Provisional Patent Application No. 62/266,669, which is titled "Cloud Metadata Discovery API" and was filed Dec. 13, 2015, the disclosures of which are hereby incorporated by reference herein in their entirety.

BACKGROUND

Each cloud system comprises different sets endpoints that are used to deliver services to end users. Typically, these endpoints have been hard coded in tools or the end-user is expected to know about them before interacting with the clouds. Users have had the ability to add custom environments, but that requires the users to know about the cloud endpoints, and the onus is on the end-user to ensure accuracy. For example, Azure Cloud from Microsoft Corporation is hardcoded in these tools.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

When creating experiences that span multiple clouds, applications need to be configured with many details about those clouds. Typically this configuration is done manually which is subject to human error and is hard to change later, especially in a way that avoids downtime. This invention provides techniques for cataloging and exposing all the information necessary to build cloud experiences and also facilitate cloud reconfiguration without downtime of the application consuming the cloud by providing a discovery mechanism.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
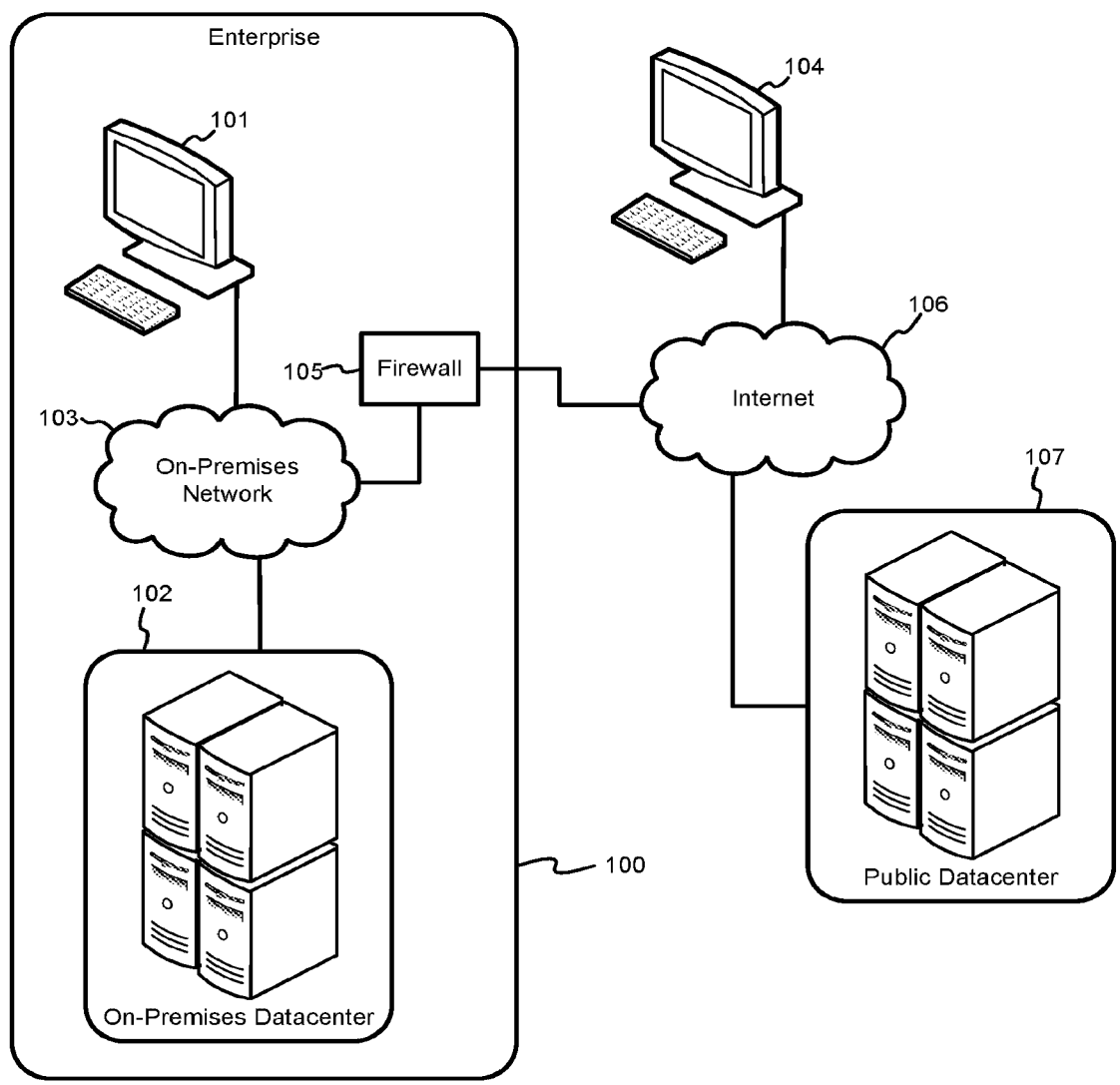
FIG. 1 is a high level block diagram of a system that provides enterprise users with access to local, on-premises resources and to remote or public resources.

FIG. 1 is a high level block diagram of a system that provides enterprise users with access to local, on-premises resources and to remote or public resources. Local enterprise terminal 101 allows users to directly access on-premises datacenter (private cloud) 102 via on-premises network 103. Users located outside enterprise 100 may access on-premises datacenter 102 using remote terminal 104. Terminals 101 and 104 may be, for example, a desktop, laptop, notebook, or tablet computer. Other devices, such as dedicated terminals, smartphones, personal digital assistants (PDA), etc. may also be used as terminals 101 and 104.

Firewall 105 provides network security system for enterprise 100 and controls incoming and outgoing network traffic. External terminal 104 may connect to enterprise on-premises network 103 via Internet 106 or any public or private network. Firewall 105 allows terminal 104 to access on-premises datacenter 102 if terminal 104 provides the appropriate credentials and authentication. Enterprise users at terminals 101 and 104 may also access public datacenter (public cloud) 107 via Internet 106.

On-premises datacenter 102 and public datacenter 107 may provide "cloud computing" services to enterprise 100 and other users. By freeing enterprise users from managing information technology (IT) infrastructure, cloud computing provides virtually limitless compute, storage, and network resources at low cost, while allowing services to scale on demand.

Figure 2:
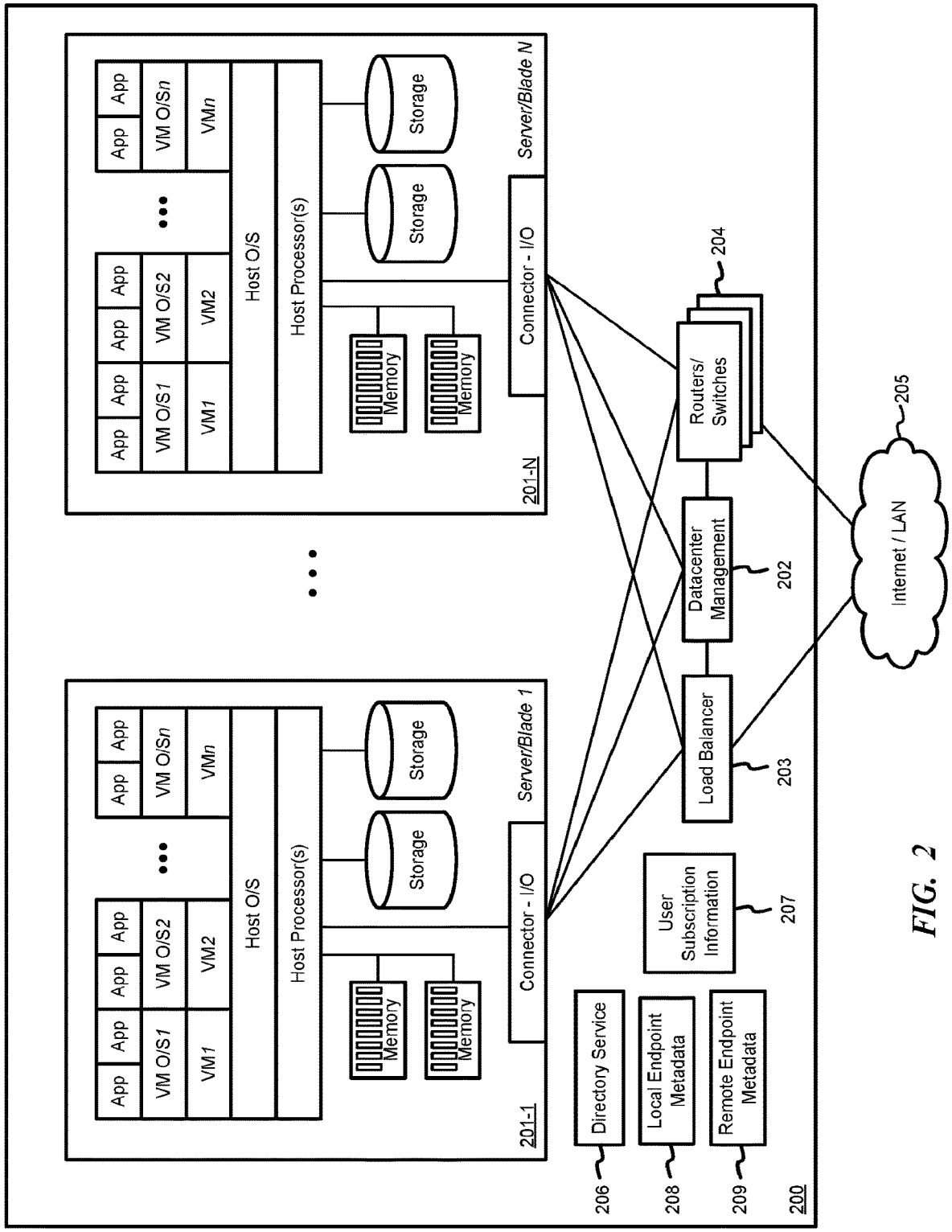
FIG. 2 is a block diagram of a datacenter that provides cloud computing services or distributed computing services according to one embodiment.

FIG. 2 is a block diagram of a distributed computing network or datacenter 200 that provides cloud computing services or distributed computing services according to one embodiment. A plurality of servers 201 are managed by datacenter management controller 202. Load balancer 203 distributes requests and workloads over servers 201 to avoid a situation where a single server 201 becomes overwhelmed and to maximize available capacity and performance of the resources in datacenter 200. Routers/switches 204 support data traffic between servers 201 and between datacenter 200 and external resources and users via external network 205, which may be a local area network (LAN) in the case of an enterprise, on-premises datacenter 102 or the Internet in the case of a public datacenter (107).

Servers 201 may be traditional standalone computing devices and/or they may be configured as individual blades in a rack of many server devices. Servers 201 have an input/output (I/O) connector that manages communication with other database entities. One or more host processors on each server 201 run a host operating system (O/S) that supports multiple virtual machines (VM). Each VM may run its own O/S so that each VM O/S on a server is different, or the same, or a mix of both. The VM O/S's may be, for example, different versions of the same O/S (e.g., different VMs running different current and legacy versions of the Windows® operating system). In addition, or alternatively, the VM O/S's may be provided by different manufacturers (e.g., some VMs running the Windows® operating system, while others VMs run the Linux® operating system). Each VM may then run one or more applications (App). Each server also includes storage (e.g., hard disk drives (HDD)) and memory (e.g., RAM) that can be accessed and used by the host processors and VMs.

Cloud computing is the delivery of computing capabilities as a service, making access to IT resources like compute power, networking and storage as available as water from a faucet. As with any utility, users generally only pay for what they use with cloud computing. By tapping into cloud services, users can harness the power of massive data centers without having to build, manage or maintain costly, complex IT building blocks. With the cloud, much of the complexity of IT is abstracted away, letting users focus just on the infrastructure, data and application development that really matter to their business.

Datacenter 200 provides pooled resources on which customers or tenants can dynamically provision and scale applications as needed without having to add more servers or additional networking. This allows tenants to obtain the computing resources they need without having to procure, provision, and manage infrastructure on a per-application, ad-hoc basis. A cloud computing datacenter 200 allows tenants to scale up or scale down resources dynamically to meet the current needs of their business. Additionally, a datacenter operator can provide usage-based services to tenants so that they pay for only the resources they use, when they need to use them. For example, a tenant may initially use one VM on server 201-1 to run their applications. When demand increases, the datacenter may activate additional VMs on the same server and/or on a new server 201-N as needed. These additional VMs can be deactivated if demand later drops.

Datacenter 200 may offer guaranteed availability, disaster recovery, and back-up services. For example, the datacenter may designate one VM on server 201-1 as the primary location for the tenant's application and may activate a second VM on the same or different server as a standby or back-up in case the first VM or server 201-1 fails. Database manager 202 automatically shifts incoming user requests from the primary VM to the back-up VM without requiring tenant intervention. Although datacenter 200 is illustrated as a single location, it will be understood that servers 201 may be distributed to multiple locations across the globe to provide additional redundancy and disaster recovery capabilities.

The datacenter operator may offer different levels of cloud computing services to tenants. With an Infrastructure-as-a-Service (IaaS) offering, the lower levels of the IT stack are delivered as a service, which frees up developers from much of the complexity of provisioning physical machines and configuring networks. With IaaS, tenants can easily provision virtual machines in a highly scalable and available cloud environment, develop and test solutions, then deploy applications to production. With a Platform-as-a-Service (PaaS) offering, everything from network connectivity through the runtime is provided. PaaS makes development easy by providing additional support for application services and management of the operating system, including updates. With PaaS, tenants can focus on the business logic of application and quickly move applications from concept to launch. With a Software-as-a-Service (SaaS) offering, a single finished application or suite of applications can be delivered to customers through a web browser, thereby eliminating their need to manage the underlying components of the IT stack including application code.

Referring again to FIG. 1, an enterprise may use a public datacenter or public cloud computing services to take advantage of cost savings, reduced management requirements, or particular services offered. On the other hand, the enterprise may also use an on-premises datacenter or private cloud services to ensure data security or to use a proprietary application, for example. It will be understood that an enterprise does not have to use an on-premises datacenter to take advantage of private cloud services. Instead, private cloud services may be provided by a datacenter that limits access to the enterprise. The use of both public cloud services and private cloud services by an enterprise is referred to generally as a hybrid cloud.

As cloud services are diversified, public cloud presences, such as through Azure Cloud services from Microsoft Corporation, and private cloud presence, such as through Azure Stack from Microsoft Corporation, are spreading across different countries. Embodiments allow these clouds to advertise each of their endpoints through a common endpoint that is present in each of the clouds. This makes the lives of customers easier and reduces errors due to human intervention.

Embodiments implement an API at the API layer, which is the central interface that controls access to the underlying services. A sample response from this endpoint looks like:

```
{
    "authentication": {
        "authenticationEndpoint": "https://login.windows.net/",
        "resourceManagerResourceId":
        "https://management.core.windows.net/"
    },
    "galleryEndpoint": "https://gallery.azure.com/",
    "graphEndpoint": "https://graph.windows.net/",
    "managementPortalEndpoint": "https://portal.azure.com/",
    "resourceManagerEndpoint": "https://management.azure.com/",
}
```

Using this information, developer tools or users can authenticate themselves against an identity system in the cloud using their credentials and the resource identifiers that are specified by authentication protocols and that are obtained through this cloud metadata discovery API. Once successfully authenticated, users will be able to perform operations against the API.

There is a secondary aspect to the Discovery mechanism. When two or more clouds use the same identity system, we can store tags to each of these cloud's registration within the identity system. By doing this, when a user signs into an identity system, through any tool, the tool can automatically get a list of clouds that are registered and is available to the user.

With this mechanism, the cloud system reduces the number of inputs required from a user to consume a cloud to a single input. This greatly simplifies the transition to using multiple clouds and provides the user with a seamless experience.

Users require a lot of information to consume cloud services, such as the list of service endpoints and addresses. Embodiments provide a central location for obtaining information about a particular cloud service. An API call by the user or a service will return a list of all available endpoints in the cloud. This also allows services running on different clouds to interact with each other.

In one embodiment, the API allows a user, service, or resource operating on a first cloud to query a second cloud for endpoint metadata. In response to the query, the second cloud provides a response, such as in a JSON (JavaScript Object Notation) format, that includes a list of endpoints and addresses that are required to interact with the second cloud. In this way, the user, service, or resource on the first cloud does not have to know all of the hardcoded information about the second cloud before interacting with the second cloud. This also allows for automatic or self-discovery of the cloud.

Additionally, in other embodiments, when a user signs in using a directory service, such as Microsoft Corporation's Active Directory, the first cloud service may automatically query all other clouds for which the user has access. In this way, the first cloud may automatically obtain tokens for those other clouds and can then automatically access those clouds.

Referring again to FIG. 2, a distributed computing system may comprise a directory service 206 that is configured to authenticate and authorize users on the distributed computing system 200. A user subscription storage 207 is used to store information that identifies which services are available to users locally on the distributed computing system. The subscription storage 207 may also store information that identifies which services are available to users on one or more remote distributed computing systems or remote cloud systems.

A local endpoint metadata storage 208 stores endpoint metadata information associated with services that are available on the distributed computing system 200. A remote endpoint metadata storage 209 stores endpoint metadata information associated with services on the one or more remote cloud systems. The endpoint metadata information may include, for example, addresses for endpoints required to access management, authentication, and resource services.

The directory service 206 may be configured to identify one or more remote cloud systems that are associated with the user and to send an endpoint query to the remote cloud systems. The directory service 209 may be further configured to receive responses from the one or more remote cloud systems, wherein the responses comprises endpoint metadata information associated with the remote cloud systems. The directory service 206 may save the endpoint metadata information from the remote cloud systems to the remote endpoint metadata storage 209.

The directory service 206 may be further configured to respond to requests for endpoint metadata information received from remote cloud systems. The response from the directory service 206 may include, for example, a list of all available endpoints on the distributed computing system that are stored in the local endpoint metadata storage 208.

User subscription information storage 207, local endpoint metadata storage 208, and remote endpoint metadata storage 209 may be the same or separate storage media, such as computer storage media that includes, but is not limited to, RAM, ROM, EEPROM, flash memory or other memory technology, optical disk storage, magnetic cassettes, magnetic tape, magnetic disk storage or other magnetic storage devices, or any other medium which can be used to store the desired information and which can accessed by the system 200 and directory service 206.

Figure 3:
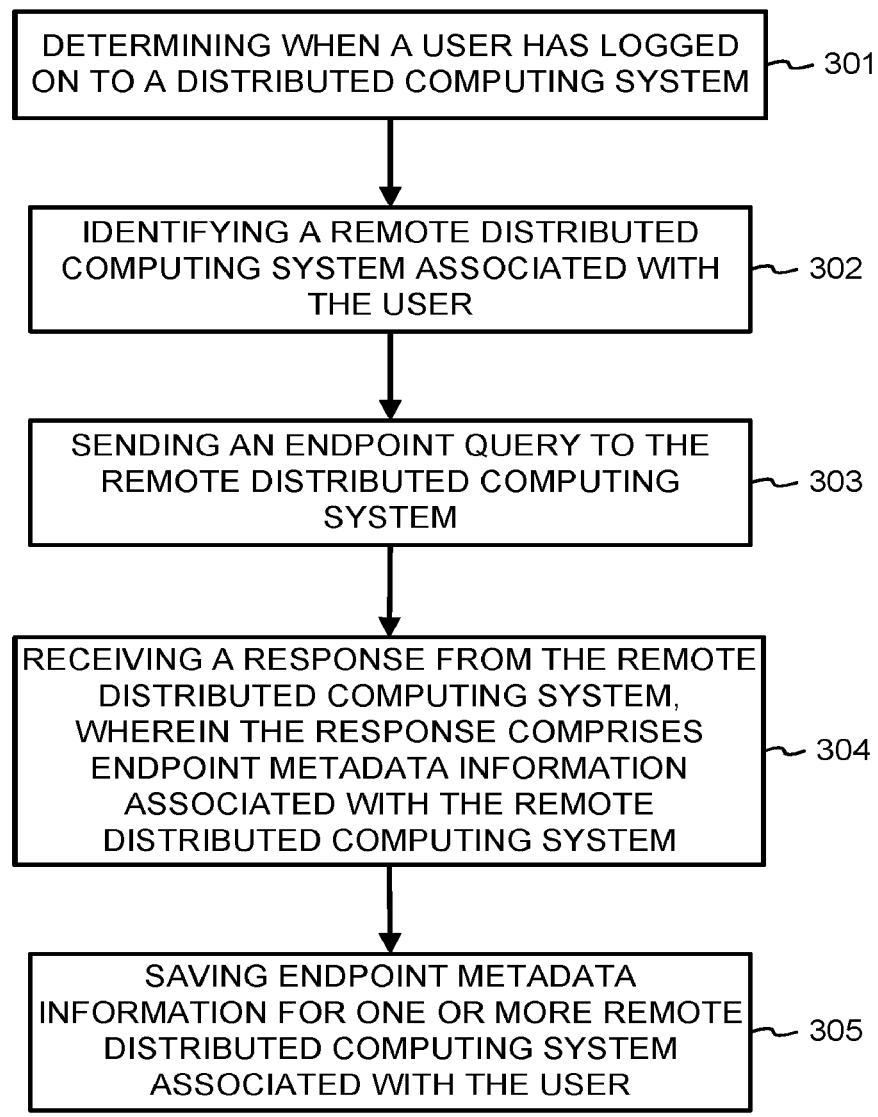
FIG. 3 is a flow chart illustrating an example method for obtaining metadata from a remote distributed computing system.

FIG. 3 is a flow chart illustrating an example method for obtaining metadata from a remote distributed computing system. In step 301, a local distributed computing system determines when a user has logged on. In one embodiment, a directory service on the local distributed computing system determines when a user has logged on. In step 302, a remote distributed computing system is identified as associated with the user. The local and remote distributed computing systems may provide, for example, separate cloud computing services, such as public and/or private cloud services.

In step 303, an endpoint query is sent to the remote distributed computing system. In one embodiment, the directory service may send the endpoint query to the remote distributed computing system. In step 304, a response is received from the remote distributed computing system. The response comprises endpoint metadata information associated with the remote distributed computing system. In step 305, the endpoint metadata information for one or more remote distributed computing system associated with the user is saved on the local distributed computing system.

The endpoint query may be a single request for all endpoint address information associated with the remote distributed computing system. The endpoint metadata information may include, for example, addresses for endpoints required to access management, authentication, and resource services on the remote distributed computing system. The endpoint metadata information may comprises a list of all available endpoints on the remote distributed computing system.

The response may comprise one or more of an authentication endpoint, a resource manager resource identifier, a gallery or marketplace endpoint, a graph or directory endpoint, a management portal endpoint, and a resource manager endpoint.

The directory service may use the endpoint metadata information for the remote distributed computing system to automatically obtain authentication tokens to allow the user to access that system.

Figure 4:
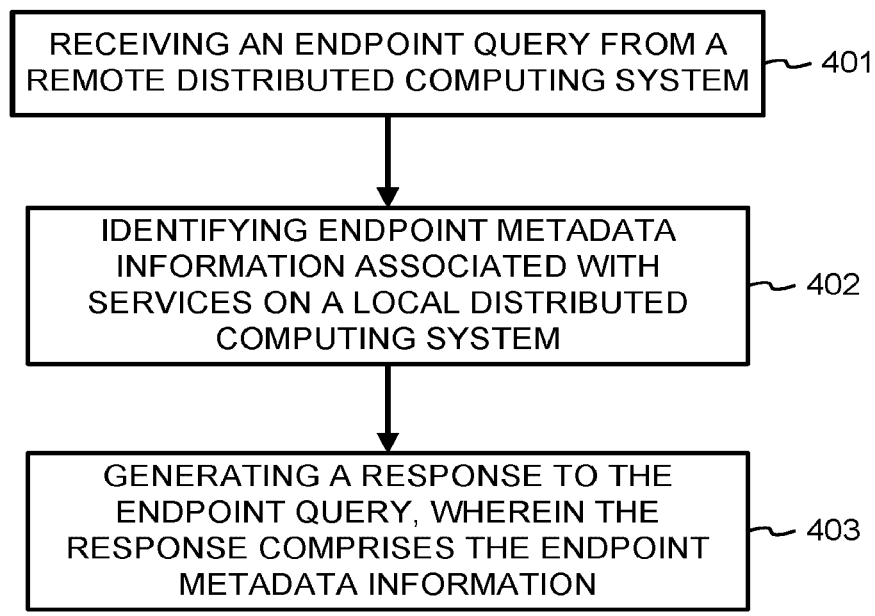
FIG. 4 is a flow chart illustrating an example method for providing metadata to a remote distributed computing system.

FIG. 4 is a flow chart illustrating an example method for providing metadata to a remote distributed computing system. In step 401, an endpoint query is received from a remote distributed computing system. In step 402, endpoint metadata information is identified as being associated with services on a local distributed computing system. In step 403, a response to the endpoint query is generated. The response comprises the endpoint metadata information for the local distributed computing system. The response is sent to the requesting remote distributed computing system, which allows the remote distributed computing system to access services on the local distributed computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A directory service comprising:
   at least one processor; and
   one or more hardware storage devices having stored computer-executable instructions which are executable by the at least one processor to cause the directory service to perform a method for controlling access to services, the method comprising:
   the directory service, which is a part of a local distributed computing system, receiving, from a remote distributed computing system, a single endpoint query request comprising a request for endpoint address metadata associated with remote endpoints of the local distributed computing system accessible to the remote distributed computing system;
   the directory service, based on an identity associated with the remote distributed computing system, identifying the remote endpoints available to the remote distributed computing system; and
   the directory service transmitting, to the remote distributed computing system, a response to the single endpoint query request, the response enabling the remote distributed computing system to automatically obtain authentication tokens that allow the remote distributed computing system to access at least one remote endpoint of the remote endpoints, the response comprising at least:
endpoint metadata information for each of the remote endpoints available to a user at the remote distributed computing system; and
an address for accessing the at least one remote endpoint.

2. The directory service of claim 1, wherein the identity associated with the remote distributed computing system is determined based on an identity of a user that is authenticated at the remote distributed computing system.

3. The directory service of claim 1, wherein the method further includes identifying a remote cloud system associated with the user and sending an endpoint query to the remote cloud system.

4. The directory service of claim 3, wherein the method further includes receiving a response to the endpoint query from the remote cloud system, the response comprising endpoint metadata information associated with the remote cloud system.

5. The directory service of claim 4, wherein the method further includes saving the endpoint metadata information.

6. The directory service of claim 4, wherein the endpoint metadata information comprises addresses for endpoints required to access management, authentication, and resource services on the remote cloud system.

7. The directory service of claim 1, wherein the response comprises a list of all available remote endpoints available to the user through the remote distributed computing system based on the authentication tokens.

8. An endpoint in a distributed computing system, the endpoint comprising:
at least one processor; and
one or more hardware storage devices having stored computer-executable instructions which are executable by the at least one processor to cause the endpoint to perform a method for providing endpoint information for a plurality of remote endpoints in the distributed computing system that are available to a requesting computing system that is remote to the endpoint, the method comprising:
the endpoint receiving, from the requesting computing system, a single endpoint query request comprising a request for endpoint address metadata associated with the plurality of remote endpoints accessible to a user through the requesting computing system;
the endpoint, based on an identity associated with the requesting computing system, identifying the plurality of remote endpoints that are available to the requesting computing system; and
the endpoint transmitting, to the requesting computing system a response to the single endpoint query request, the response comprising at least endpoint metadata information for each available endpoint of the plurality of remote endpoints available to the user through the requesting computing system, along with an address for accessing at least one remote endpoint of the plurality of remote endpoints, the response enabling the requesting computing system to automatically obtain an authentication token that is usable to access the at least one remote endpoint.

9. The endpoint of claim 8, wherein the identity associated with the requesting computing system is determined based on an identity of the user which is authenticated at the requesting computing system.

10. The endpoint of claim 8, wherein the method further includes identifying a remote cloud system associated with the user and sending an endpoint query to the remote cloud system.

11. The endpoint of claim 10, wherein the method further includes receiving a response to the endpoint query from the remote cloud system, the response comprising endpoint metadata information associated with the remote cloud system.

12. The endpoint of claim 11, wherein the method further includes saving the endpoint metadata information.

13. The endpoint of claim 11, wherein the endpoint metadata information comprises addresses for endpoints required to access management, authentication, and resource services on the remote cloud system.

14. The endpoint of claim 8, wherein the response comprises a list of each available endpoint of the plurality of remote endpoints available to the user through the requesting computing system.

15. A method implemented by an API for controlling access to underlying services associated with one or more endpoint systems in a local distributed computing network, the API running at an API layer on a computing system in the local distributed computing network, the method comprising:
the API receiving a single endpoint query request comprising a request for endpoint address metadata associated with remote endpoints in the local distributed computing network accessible to a user through a requesting computing system that is remote to the local distributed computing network;
the API, based on an identity associated with the requesting computing system, identifying a plurality of remote endpoints available to the requesting computing system; and
the API providing a response to the single endpoint query request, the response comprising at least endpoint metadata information for each available remote endpoint of the plurality of remote endpoints that is available to the user through the requesting computing system, along with an address for accessing at least one remote endpoint available to the requesting computing system, the response enabling the requesting computing system to automatically obtain an authentication token that is used by the requesting computing system to access the at least one remote endpoint of the plurality of remote endpoints.

16. The method of claim 15, wherein the identity associated with the requesting computing system is determined based on an identity of the user which is authenticated at the requesting computing system.

17. The method of claim 15, wherein the method further includes identifying a remote cloud system associated with the user and sending an endpoint query to the remote cloud system.

18. The method of claim 17, wherein the method further includes receiving a response to the endpoint query from the remote cloud system, the response comprising endpoint metadata information associated with the remote cloud system.

19. The method of claim 18, wherein the method further includes saving the endpoint metadata information.

20. The method of claim 18, wherein the endpoint metadata information comprises addresses for endpoints required to access management, authentication, and resource services on the remote cloud system.

* * * * *